United States Patent
Song et al.

(10) Patent No.: US 9,045,607 B2
(45) Date of Patent: Jun. 2, 2015

(54) POLYMER MEMBRANE AND MEMBRANE-ELECTRODE ASSEMBLY FOR FUEL CELL AND FUEL CELL SYSTEM COMPRISING SAME

(75) Inventors: Min-Kyu Song, Suwon-si (KR); You-Mee Kim, Suwon-si (KR); Ho-Jin Kweon, Suwon-si (KR); Hee-Woo Rhee, Seoul (KR)

(73) Assignee: Samsung SDI Co., Ltd., Yongin-si (KR)

( * ) Notice: Subject to any disclaimer, the term of this patent is extended or adjusted under 35 U.S.C. 154(b) by 2083 days.

(21) Appl. No.: 11/478,961

(22) Filed: Jun. 28, 2006

(65) Prior Publication Data

US 2006/0292415 A1  Dec. 28, 2006

(30) Foreign Application Priority Data

Jun. 28, 2005 (KR) .................. 10-2005-0056245
Jun. 28, 2006 (KR) .................. 10-2006-0058453

(51) Int. Cl.
*H01M 8/10* (2006.01)
*C08J 5/22* (2006.01)
(Continued)

(52) U.S. Cl.
CPC .............. *C08J 5/2275* (2013.01); *H01M 4/90* (2013.01); *H01M 8/0291* (2013.01); *H01M 8/1004* (2013.01); *H01M 8/1023* (2013.01); *H01M 8/1025* (2013.01); *H01M 8/1027* (2013.01); *H01M 8/103* (2013.01); *H01M 8/1032* (2013.01); *H01M 8/1039* (2013.01); *H01M 8/1044* (2013.01); *H01M 8/1051* (2013.01);
(Continued)

(58) Field of Classification Search
CPC .............. C08J 2327/00; C08J 5/2275; H01M 2300/0071; H01M 2300/0082; H01M 2300/0091; H01M 4/90; H01M 8/0291; H01M 8/1004; H01M 8/1023; H01M 8/1025; H01M 8/1027; H01M 8/103; H01M 8/1032; H01M 8/1039; H01M 8/1044; H01M 8/1051; H01M 8/106; H01M 8/1067; Y02E 60/522
USPC ........... 429/30, 32–33, 44, 306, 309; 252/500
See application file for complete search history.

(56) References Cited

U.S. PATENT DOCUMENTS 6,054,230 A * 4/2000 Kato ............................. 429/33
6,245,847 B1   6/2001 Green et al.
(Continued)

FOREIGN PATENT DOCUMENTS

CN  1471186  1/2004
CN  1618846  5/2005
(Continued)

OTHER PUBLICATIONS

Korean patent abstracts of publication No. 1020060048562 A dated May 18, 2006 in the name of Min Kyu Song, et al.
(Continued)

*Primary Examiner* — Patrick Ryan
*Assistant Examiner* — Ben Lewis
(74) *Attorney, Agent, or Firm* — Christie, Parker & Hale, LLP

(57) ABSTRACT

The polymer electrolyte membrane of the present invention includes a proton conductive cation exchange resin, a non-proton-conductive polymer, and an inorganic additive. The inorganic additive is adapted to inhibit a phase separation between the proton conductive cation exchange resin and the non-proton-conductive polymer.

24 Claims, 6 Drawing Sheets

(51) Int. Cl.
*H01M 4/90* (2006.01)
*H01M 8/02* (2006.01)

(52) U.S. Cl.
CPC ............ *H01M 8/106* (2013.01); *H01M 8/1067* (2013.01); *H01M 2300/0071* (2013.01); *H01M 2300/0082* (2013.01); *H01M 2300/0091* (2013.01); *Y02E 60/522* (2013.01); *C08J 2327/00* (2013.01)

(56) References Cited

U.S. PATENT DOCUMENTS

| | | | |
|---|---|---|---|
| 6,638,659 B1 * | 10/2003 | Fenton et al. | 429/40 |
| 7,811,694 B2 | 10/2010 | Song et al. | |
| 2002/0127474 A1 * | 9/2002 | Fleischer et al. | 429/309 |
| 2003/0054219 A1 * | 3/2003 | Won et al. | 429/33 |
| 2003/0160352 A1 | 8/2003 | Middelman | |
| 2004/0048129 A1 * | 3/2004 | Taft et al. | 429/33 |
| 2004/0247975 A1 * | 12/2004 | Song et al. | 429/33 |
| 2006/0027789 A1 * | 2/2006 | Ivanov et al. | 252/500 |
| 2007/0265174 A1 * | 11/2007 | Schlenoff | 508/106 |

FOREIGN PATENT DOCUMENTS

| | | |
|---|---|---|
| EP | 1 511 112 A1 | 3/2005 |
| JP | 2000-222938 A | 8/2000 |
| JP | 2004-172124 | 6/2004 |
| JP | 2004-217921 | 8/2004 |
| JP | 2006-114502 A | 4/2006 |
| KR | 2002-96302 | 12/2002 |
| KR | 1020030032321 * | 4/2003 |
| KR | 10 2004-0096302 | 6/2004 |
| KR | 10-2006-0048562 | 5/2006 |
| WO | WO 96/29752 | 9/1996 |
| WO | WO 02/103834 A1 | 12/2002 |

OTHER PUBLICATIONS

Korean Patent Abstract, Publication No. 1020020096302 A; dated Dec. 31, 2002 in the name of Min Kyu Song.
Korean Patent Abstract, Publication No. 1020040051287 A; dated Jun. 18, 2004 in the name of Hye Gyeong Kim.
European Search Report, dated Sep. 11, 2006, for EP 06116177.4, in the name of Samsung SDI Co., Ltd.
Patent Abstracts of Japan and machine translation for JP publication No. JP 2000-222938 dated Aug. 11, 2003 in the name of Okuyama et al.
Notice of Allowance issued Oct. 12, 2010 in corresponding Japanese patent application No. 2006-178424.

* cited by examiner

POLYMER MEMBRANE AND MEMBRANE-ELECTRODE ASSEMBLY FOR FUEL CELL AND FUEL CELL SYSTEM COMPRISING SAME

CROSS-REFERENCES TO RELATED APPLICATION

This application claims priority to and the benefit of Korean Patent Application Nos. 10-2005-0056245 and 10-2006-0058453, filed in the Korean Intellectual Property Office on Jun. 28, 2005, and Jun. 28, 2006, the entire contents of which are incorporated herein by references.

BACKGROUND OF THE INVENTION

1. Field of the Invention

The present invention relates to a polymer electrolyte membrane for a fuel cell, and a membrane-electrode assembly and a fuel cell system including the same. More particularly, the present invention relates to a polymer electrolyte membrane for inhibiting cross-over of a hydrocarbon fuel, and a membrane-electrode assembly and a fuel cell system including the same.

2. Description of the Related Art

A fuel cell is a power generation system for producing electrical energy through an electrochemical redox reaction of an oxidant and a hydrogen fuel contained in a hydrocarbon-based material, such as methanol, ethanol, or natural gas.

Representative examples of fuel cells include a polymer electrolyte membrane fuel cell (PEMFC) and a direct oxidation fuel cell (DOFC). The direct oxidation fuel cell includes a direct methanol fuel cell which uses methanol as a fuel.

A polymer electrolyte membrane fuel cell (PEMFC) has a high energy density, but requires a fuel reforming processor for reforming methane, methanol, natural gas, and the like, in order to produce a hydrogen-rich gas as the fuel gas.

By contrast, a direct oxidation fuel cell (DOFC) has an energy density that is lower than the polymer electrolyte membrane fuel cell, but does not need a fuel reforming processor.

A fuel cell includes a stack that actually generates the electricity. The stack includes several unit cells stacked in a multi-layer fashion. Each of the unit cells is made up of a membrane-electrode assembly (MEA) and a separator (also referred to as a bipolar plate). The membrane-electrode assembly has an anode (referred to as a fuel electrode or an oxidation electrode) and a cathode (referred to as an air electrode or a reduction electrode) separated from each other by a polymer electrolyte membrane.

Perfluorosulfonic acid resin (e.g., NAFION®) can used as a material for forming the polymer electrolyte membrane. A polymer electrolyte membrane formed using perfluorosulfonic acid resin has an oxygen solubility, an electrochemical stability, and a durability that are higher than a hydrocarbon polymer membrane.

In general, a thicker perfluorosulfonic acid resin membrane at a thickness ranging from 50 to 175 µm provides better dimensional stability and mechanical properties than a thinner perfluorosulfonic acid resin membrane, but the thicker perfluorosulfonic acid resin membrane has a higher membrane resistance than the thinner perfluorosulfonic acid resin membrane. By contrast, the thinner membrane has a higher proton conductivity, but may also allow unreacted fuel gas and liquid to pass through its thinner polymer membrane resulting in a lost of unreacted fuel gas to thereby lower the performance of the fuel cell.

SUMMARY OF THE INVENTION

An aspect of the present invention provides a polymer electrolyte membrane that has a high proton conductivity and a good inhibition against hydrocarbon fuel cross-over.

Another aspect of the present invention provides a membrane-electrode assembly that includes the above polymer electrolyte membrane.

Another aspect of the present invention provides a fuel cell system that includes the above polymer electrolyte membrane.

According to an embodiment of the present invention, a polymer electrolyte membrane is provided to include a proton conductive cation exchange resin, a non-proton-conductive polymer, and an inorganic additive. The inorganic additive is adapted to inhibit a phase separation between the proton conductive cation exchange resin and the non-proton-conductive polymer. According to another embodiment of the present invention, a polymer electrolyte membrane is provided to include the proton conductive cation exchange resin, the non-proton-conductive polymer, the inorganic additive, and a porous supporter having a plurality of pores. The porous supporter supports the proton conductive cation exchange resin, the non-proton-conductive polymer, and the inorganic additive, and includes a non-proton-conductive polymer. The proton conductive cation exchange resin, the non-proton-conductive polymer, and the inorganic additive transfer protons and thus can be collectively referred to as a proton transport layer. The proton transport layer can be present inside the pores or on a surface of the porous supporter.

According to another embodiment of the present invention, a membrane-electrode assembly for a fuel cell includes an anode and a cathode facing each other and at least one of the above polymer electrolyte membranes interposed therebetween.

According to another embodiment of the present invention, a fuel cell system includes at least one electricity generating element, a fuel supplier, and an oxidant supplier. The electricity generating element includes a membrane-electrode assembly, which includes at least one of the above polymer electrolyte membranes and a cathode and an anode positioned at both sides of the polymer electrolyte membrane, and separators positioned at both sides of the membrane-electrode assembly. The fuel supplier supplies a fuel to the electricity generating element and an oxidant supplier supplies an oxidant to the electricity generating element.

DETAILED DESCRIPTION

Figure 1:
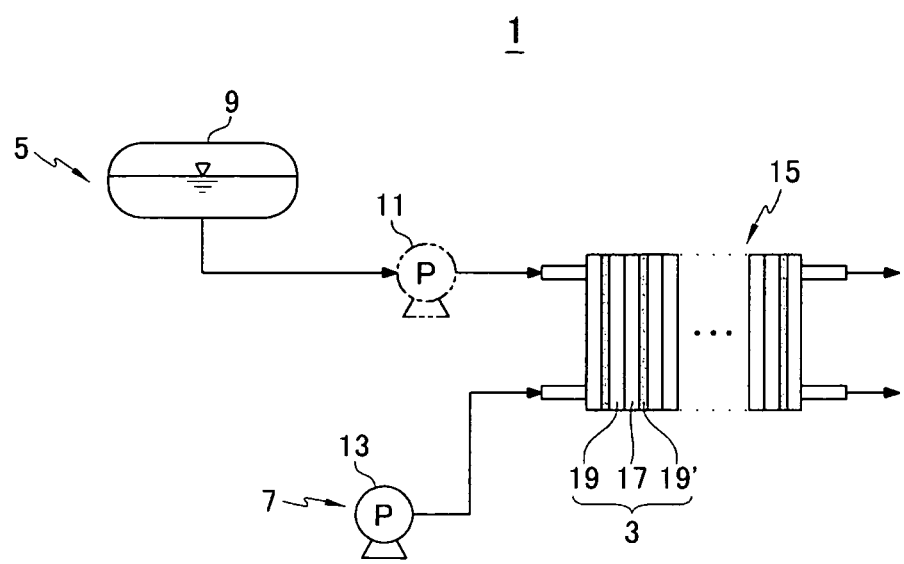
FIG. 1 is a schematic diagram showing a structure of a direct oxidation fuel cell system in accordance with one embodiment of the present invention.

In general, a thicker perfluorosulfonic acid resin membrane provides better dimensional stability and mechanical properties than a thinner perfluorosulfonic acid resin membrane, but the thicker perfluorosulfonic acid resin membrane has a higher membrane resistance than the thinner perfluorosulfonic acid resin membrane. By contrast, the thinner membrane has a higher proton conductivity, but may also allow unreacted fuel gas and liquid to pass through its thinner polymer membrane resulting in a loss of unreacted fuel gas to thereby lower the performance of the fuel cell.

In more detail, hydrocarbon fuels such as methanol, ethanol, or propanol may be transmitted through a hydrophilic portion of a perfluorosulfonic acid resin and then be oxidized at a cathode, which causes a loss of fuel and oxygen reduction sites, resulting in significant deterioration of fuel cell performance characteristics.

To improve fuel separation while maintaining good proton conductivity, a polymer electrolyte membrane may include a compatible polymer blend of a perfluorosulfonic acid resin and a hydrocarbon-based polymer having no ionic conductivity but good separation capability for hydrocarbon fuel. The hydrocarbon-based polymer can be a polyvinylidene fluoride-based polymer due to its partial compatibility with the perfluorosulfonic acid resin and excellent chemical resistance. However, the polyvinylidene may cause a phase separation due to a density variation of a polymer mixed solution and thus a significant conductivity variation along the thickness of the polymer electrolyte membrane may result.

A polymer electrolyte membrane according to one embodiment of the present invention provides a thin membrane with little or no phase separation.

A polymer electrolyte membrane according to one embodiment of the present invention includes a proton conductive cation exchange resin, a non-proton-conductive polymer, and an inorganic additive.

A polymer electrolyte membrane according to one embodiment of the present invention may further include a porous supporter composed of a non-proton-conductive supporting polymer that supports the proton conductive cation exchange resin, the non-proton-conductive polymer, and the inorganic additive, and includes a plurality of pores. The proton conductive cation exchange resin, the non-proton-conductive polymer, and the inorganic additive are for transporting protons and thus are referred to collectively as a proton transport layer. The proton transport layer may be present in the pores or on a surface of the porous supporter.

The non-proton-conductive polymer of the proton transport layer can improve mechanical properties and hydrocarbon fuel separation performance characteristics of the polymer electrolyte membrane (e.g., a thin polymer electrolyte membrane). Non-limiting examples of the non-proton conductive polymer include polyvinylidene fluoride homopolymers, polyvinylidene fluoride-hexafluoropropylene copolymers, polyacrylonitrile, polymethylmethacrylate, polyvinylalcohol, or combinations thereof.

The non-proton-conductive supporting polymer may include homopolymers selected from the group consisting of polytetrafluoroethylene, polyvinylidene fluoride, polyethylene, polypropylene, polyimide, polybenzoxazole, polybenzimidazole, combinations thereof, and copolymers thereof.

In the proton transport layer of the polymer electrolyte membrane according to one embodiment of the present invention, the non-proton-conductive supporting polymer constituting the porous supporter may include fluoro-based polymers, such as polytetrafluoroethylene, polyvinylidene fluoride, or copolymers thereof, and, in one embodiment, may include polytetrafluoroethylene homopolymers. Here, when both the porous supporter and the proton conductive cation exchange resin are fluoro-based polymers, a binding force increases. The porous supporter may have a porosity of 60% or more. According to one embodiment, the porous supporter may have a porosity ranging from 60% to 90%. When the porosity is less than 60%, there may not be enough proton transport layer present on the surface of the porous supporter to provide the needed ionic conductivity.

The inorganic additive of the proton transport layer may be dispersed in a nano-phase manner in the polymer electrolyte membrane. The inorganic additive inhibits phase separation between the proton conductive cation exchange resin and the non-conductive polymer as well as improving hydrocarbon fuel barrier properties and thermal stability.

According to one embodiment, the inorganic additive may include inorganic silicate. The silicate can be classified into pyrophylite-talcs, montmorillonites (MMT), saponites, fluorohectorites, kaolinites, vermiculites, laponites, illites, micas, brittle micas, or tetrasilicic micas depending on the quantities of negative electric charges, and any one of such materials may be used in the embodiment of the present invention.

A montmorillonite has a structure in which an $Al^{3+}$ ion in an alumina octahedral sheet is replaced by a $Mg^{2+}$, $Fe^{2+}$, or $Fe^{3+}$ ion, and a $Si^{4+}$ ion in a silicate tetrahedral sheet is replaced with an $Al^{3+}$ ion. In addition, the montmorillonite has an overall negative charge. Further, in the montmorillonite, exchangeable cations and water molecules are included between silicate layers in order to maintain the overall charge equilibrium.

In one embodiment, the silicate has an aspect ratio ranging from 1/50 to 1/1000. In one embodiment, the silicate has an aspect ratio ranging from 1/100 to 1/800, and, in one embodiment, the silicate has an aspect ratio ranging from 1/500 to 1/800.

When the aspect ratio of the silicate is more than 1/50, exfoliated silicates cannot act as a diffusion barrier for gas and liquid and its barrier properties deteriorate. When the aspect ratio of the silicates is less than 1/1000, exfoliation by intercalation of proton conductive cation exchange resin chains is difficult, with the result that the silicates do not disperse within the proton conductive cation exchange resin in the polymer electrolyte membrane.

The silicates may be treated with an organic modifying agent. A strong Van der Waals attraction makes it difficult for the plate-shaped silicate to be exfoliated and dispersed in a polymer resin, but treatment with an organic modifying agent of low molecular weight results in its permeation between the plates, facilitating the intercalation of the polymer resin, and thus facilitating exfoliation and dispersion.

Suitable organic modifying agents include $C_1$ to $C_{20}$ alkylamines, $C_1$ to $C_{20}$ alkylene diamines, $C_1$ to $C_{20}$ quaternary ammonium salts, aminohexanes, and nitrogen-containing heterocyclic compounds. Specific examples of alkyl amines include methylamine hydrochloride, propyl amine, butyl amine, octyl amine, decyl amine, dodecyl amine, hexadecyl amine, octadecyl amine, N-methyl octadecyl amine, etc.

Non-limiting examples of alkylene diamines include 1,6-hexamethylene diamine, and 1,12-dodecane diamine. Non-limiting examples of quaternary ammonium salts include dimethyl quaternary ammonium, benzyl quaternary ammonium, 2-ethylhexyl quaternary ammonium, bis-2-hydroxyethyl quaternary ammonium, methyl quaternary ammonium, and so on. Non-limiting examples of an alkyl ammonium salt include tetramethyl ammonium chloride, octadecyl trimethyl ammonium bromide, dodecyl trimethyl ammonium bromide, dioctadecyl dimethyl ammonium bromide, and bis (2-hydroxyethyl) methyl octadecyl ammonium chloride, and so on. Non-limiting examples of aminohexanes include 6-aminohexane and 12-aminohexane. Non-limiting examples of the nitrogen-containing heterocyclic compounds include 1-hexadecylpyridium chloride.

As mentioned above, the inorganic silicate may be used after treatment with an organic modifying agent. Alternatively, commercially available organically modified inorganic silicate may be used. Suitable organically modified inorganic silicates include Cloisite6A, Cloisite10A, Cloisite15A, Cloisite20A, Cloisite25A, and Cloisite30B manufactured by Southern Clay Products Inc. In one embodiment, Cloisite10A is used.

The proton conductive cation exchange resin provides a composite membrane with ion conductivity. The proton conductive cation exchange resin may be any polymer resin having a cation exchange group at its side chain. The cation exchange group is selected from the group consisting of a sulfonic acid group, a carboxylic acid group, a phosphonic acid group, and derivatives thereof. According to one embodiment of the present invention, the ion exchange ratio of the proton conductive cation exchange resin ranges from 3 to 33, and its equivalent weight (EW) ranges from 700 to 2,000.

Also, the ion exchange ratio of the ion exchange resin is determined by the number of carbons in the polymer backbone and the number of cation exchange groups.

Non-limiting examples of the proton conductive cation exchange resin include at least one proton conductive polymer selected from the group consisting of fluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, and polyphenylquinoxaline-based polymers.

Specific examples of fluoro-based polymers include poly(perfluorosulfonic acid) (NAFION®, E.I. Dupont de Nemours Company) represented by Formula 1 below; Aciplex™ (Asahi Kasei Chemical), Flemion™ (Asahi Glass), and Fumion™ (commercialized as fumatech) fluorocarbon vinyl ether represented by Formula 2 below; and vinyl ether fluoride represented by Formula 3 below. The polymers disclosed in U.S. Pat. Nos. 4,330,654, 4,358,545, 4,417,969, 4,610,762, 4,433,082, 5,094,995, 5,596,676 and 4,940,525 may also be used, and the entire contents of which are incorporated herein by reference.

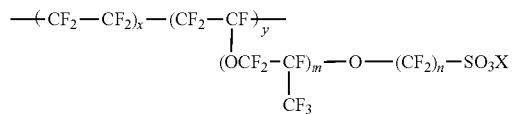
(1)

Here, in the above Formula 1, X is H, Li, Na, K, Cs, tetrabutyl ammonium, or NR1R2R3R4. R1, R2, R3, and R4 are independently selected from H, $CH_3$, and $C_2H_5$; m is at least 1; n is at least 2; x ranges from about 3.5 to 5; and y is at least 1,000.

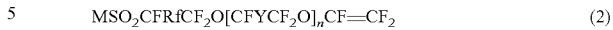
(2)

Here, in the above Formula 2, Rf is fluorine or a $C_1$ to $C_{10}$ perfluoroalkyl radical; Y is fluorine or a trifluoromethyl radical; n is from 1 to 3; M is selected from the group consisting of fluorine, a hydroxyl radical, an amino radical, and —OMe, where Me is an alkali metal radical or a quaternary ammonium radical.

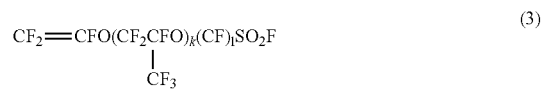
(3)

Here, in the above Formula 3, k is 0 or 1, and l is an integer from 3 to 5.

The sulfonic acid terminal groups of the above poly(perfluorosulfonic acid) (NAFION™) are hydrated to form a micelle structure, which provides a proton transport path and behaves like a typical aqueous acid solution. In one embodiment of the present invention, when poly(perfluorosulfonic acid) (NAFION™) is used as a cation exchange resin, X in the ionic exchange group (—$SO_3X$) of the terminal end of the side chain can be substituted with a univalent ion such as a hydrogen ion, a sodium ion, a potassium ion, a cesium ion, or a tetrabutyl ammonium (TBA).

Specific examples of benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, and polyphenylquinoxaline-based polymers include polybenzimidazole, polyimide, polysulfone, polysulfone derivatives, sulfonated poly(ether ether ketone) (s-PEEK), polyphenyleneoxide, polyphenylenesulfide, and polyphosphazane.

Alternatively, an electrolyte membrane where a polystyrenesulfonic acid polymer is grafted on a polyethylene, a polypropylene polymer, a fluoroethylene polymer, or an ethylene/tetrafluoroethylene polymer may be used.

In a polymer electrolyte membrane, the proton conductive cation exchange resin and non-proton-conductive polymer may be present in a weight ratio of 50 to 90:10 to 50. According to one embodiment, the proton conductive cation exchange resin and non-proton-conductive polymer are present in a weight ratio of 70 to 80:20 to 30. The inorganic additive may be used in an amount from 1 to 10 parts by weight, and, in one embodiment, in an amount from 1 to 5 parts by weight based on 100 parts by weight of the sum of the proton conductive cation exchange resin and non-proton-conductive polymer. When the non-proton-conductive polymer and the inorganic additive are present in an amount of more than the above range or the proton conductive cation exchange resin is less than the above range, conductivity of the membrane is reduced. On the contrary, when the non-proton-conductive polymer and the inorganic additive are present in an amount less than the above range, hydrocarbon fuel barrier properties may deteriorate.

A polymer electrolyte membrane of an embodiment of the present invention is a thin membrane having a thickness ranging from 10 to 50 μm. This thin membrane has good separation properties for hydrocarbon fuel and thereby can improve a power output density when being applied as the polymer electrolyte membrane of a fuel cell.

A polymer electrolyte membrane of an embodiment of the present invention may be fabricated as follows. First, an ion exchange resin with a cation exchange group is dissolved in an organic solvent to prepare a cation exchange resin solution. The cation exchange resin may be used in an amount ranging from 0.5 to 30 wt %.

The organic solvent may be a hydrophobic organic solvent such as dimethylacetate. A hydrophilic organic solvent such as an alcohol should not be used. That is, since the cation exchange resin has hydrophilicity and the inorganic additive has hydrophobicity, the inorganic additive may be precipitated when a hydrophilic solvent such as an alcohol is used for the organic solvent. Non-limiting examples of the hydrophobic organic solvent include dimethylacetate, dimethylacetamide, dimethylformamide, N-methyl-2-pyrrolidinone, and combinations thereof.

Commercially available poly(perfluorosulfonic acid) dissolved in a mixed solvent of water and 2-propanol may be used for the cation exchange resin after the mixed solvent is evaporated at room temperature, and the resulting products are redissolved in a hydrophobic solvent such as dimethylacetate to thereby prepare a cation exchange resin solution with a concentration ranging from 0.5 to 30 wt %.

To the resulting cation exchange resin solution, the non-proton-conductive polymer solution is added to prepare a cation exchange resin-polymer solution. The non-proton-conductive polymer solution includes the non-proton-conductive polymer in a concentration ranging from 5 to 30 wt %. The solvent may include dimethylacetamide, dimethylformamide, etc., and the non-proton-conductive polymer is the same as above described. The cation exchange resin solution and the non-proton-conductive polymer solution are mixed so that the cation exchange resin and the non-proton-conductive polymer might be mixed in a weight ratio of 50 to 90:10 to 50; and, in one embodiment, in a weight ratio of 70 to 80:20 to 30.

Subsequently, an inorganic additive is added to the cation exchange resin-polymer solution and then mixed. The mixing process is performed at a temperature ranging from 50 to 120° C. under a mechanical or ultrasound agitating condition. When the temperature is less than 50° C., it takes too long to perform the mixing. On the contrary, when the temperature is more than 120° C., too much solvents may be evaporated to make a concentration control difficult.

The inorganic additive may be added in an amount ranging from 1 to 10 parts by weight based on 100 parts by weight of the sum of the proton conductive cation exchange resin and non-proton-conductive polymer. When the amount of the inorganic additive is less than 1 part by weight, the barrier against a fuel cross-over can not be effectively implemented. On the contrary, when it is more than 10 parts by weight, the resulting membrane may be brittle.

The resulting solution was then formed into a film to fabricate a polymer electrolyte membrane.

Alternatively, the resulting solution may be coated on a porous supporter composed of the above described non-proton-conductive supporting polymer, and then dried at a temperature ranging from 100 to 120° C. to fabricate the polymer electrolyte membrane. The coating process may be performed using a general wet-coating method such as roll-coating, dip coating, spray coating, or slot-die coating.

The above preparation method is relatively convenient and can be used in large-scale manufacturing.

In one embodiment, a membrane-electrode assembly having an above described polymer electrolyte membrane includes an anode and a cathode facing each other, and the polymer electrolyte membrane interposed therebetween.

The anode and the cathode include a catalyst layer and an electrode substrate.

The catalyst layer includes at least one catalyst selected from the group consisting of platinum, ruthenium, osmium, platinum-ruthenium alloys, platinum-osmium alloys, platinum-palladium alloys, platinum-M alloys, and combinations thereof, where M is a transition element selected from the group consisting of Ga, Ti, V, Cr, Mn, Fe, Co, Ni, Cu, Zn, Sn, Mo, W, Rh, Ru, and combinations thereof. In the present invention, the anode and the cathode may include the same catalyst materials. Alternatively, in a direct oxidation fuel cell, an anode is formed by one or more platinum-ruthenium alloys, which can endure poisoning by CO generated during a catalyst reaction. The platinum-ruthenium alloys may include at least one material selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/RuN, Pt/Fe/Co, Pt/Ru/Rh/Ni, Pt/Ru/Sn/W, and combinations thereof.

The metal catalyst can be supported in a carrier or not supported as a black type. Suitable carriers include a carbon material, such as acetylene black, denka black, activated carbon, ketjen black, graphite, carbon nanotube, carbon nanofiber, carbon nanowire, carbon nanoball, etc., or inorganic material particulates, such as alumina, silica, zirconia, and titania.

The catalyst layer may further include a binder resin to improve its adherence and proton transfer properties.

The binder resin may be a polymer resin having a cation exchange group at its side chain. The cation exchange group may be selected from the group consisting of a sulfonic acid group, a carboxylic acid group, a phosphoric acid group, a phosphonic acid group, and derivatives thereof. Non-limiting examples of the polymer resin include at least one proton conductive polymer selected from the group consisting of perfluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer includes at least one material selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

The hydrogen (H) in the ionic exchange group of the terminal end of the proton conductive polymer side chain can be substituted with Na, K, Li, Cs, or tetrabutylammonium. When the H in the ionic exchange group of the terminal end of the proton conductive polymer side is substituted with Na or tetrabutylammonium, NaOH or tetrabutylammonium hydroxide may be used during preparation of the catalyst composition, respectively. When the H is substituted with K, Li, or Cs, any suitable compounds for the substitutions may be used.

The binder resin may be used alone or in combination with other binder resins. The binder resins may be used along with non-conductive polymers to improve adherence with a polymer electrolyte membrane. The non-conductive polymers may be used in a controlled amount to adapt to their purposes.

Non-limiting examples of the non-conductive polymers include polytetrafluoroethylene (PTFE), tetrafluoroethylene-hexafluoropropylene copolymers (FEP), tetrafluoroethyleneperfluoro alkyl vinylether copolymers (PFA), ethylene/tetrafluoroethylene (ETFE), chlorotrifluoroethylene-ethylene copolymers (ECTFE), polyvinylidenefluoride, polyvinylidenefluoride-hexafluoropropylene copolymers (PVdF-HFP), dodecylbenzenesulfonic acid, sorbitol, and combinations thereof.

The electrode substrate can be used to support an electrode and also to spread a fuel and an oxidant onto a catalyst layer to help them react with the catalyst layer. The electrode substrate is a conductive substrate. Non-limiting examples of the conductive substrate include a carbon paper, a carbon cloth, a carbon felt, and a metal cloth (e.g., a porous film having metal cloth fiber or a metalized polymer fiber).

The electrode substrate may be treated by a water-repellent fluoro-based resin to reduce or prevent a decrease of the diffusion efficiency of the reactants by water generated during fuel cell driving. The fluoro-based resin may include, but is not limited to, polytetrafluoro ethylene (PTFE), polyvinylidene fluoride, polyhexafluoro propylene, polyperfluoroalkylvinyl ether, polyperfluoro sulfonylfluoride alkoxy vinyl ether, fluorinated ethylene propylene, polychlorotrifluoroethylene, fluoroethylene polymers, and copolymers thereof.

A microporous layer (MPL) can be added between the electrode substrate and the catalyst layer to increase reactant diffusion effects. The microporous layer may include, but is not limited to, a small sized conductive powder, such as carbon powder, carbon black, acetylene black, activated carbon, carbon fiber, fullerene, nano-carbon, or combinations thereof. The nano-carbon may include a material, such as carbon nanotube, carbon nanofiber, carbon nanowire, carbon nanohorn, carbon nanoring, or combinations thereof. The microporous layer is formed by coating a composition including a conductive powder, a binder resin, and a solvent on the electrode substrate. The binder resin may include, but is not limited to, polytetrafluoro ethylene (PTFE), polyvinylidene fluoride, polyhexafluoro propylene, polyperfluoroalkylvinyl ether, polyperfluoro sulfonyl fluoride, alkoxy vinyl ether, polyvinylalcohol, celluloseacetate, or copolymers thereof. The solvent may include, but is not limited to, an alcohol, such as ethanol, isopropyl alcohol, ethyl alcohol, n-propyl alcohol, or butyl alcohol; water; dimethylacetamide (DMA); dimethylformamide; dimethylsulfoxide (DMSO); N-methylpyrrolidone; or tetrahydrofuran.

The coating method may include, but is not limited to, screen printing, spray coating, doctor blade methods, gravure coating, dip coating, silk screening, painting, etc., depending on the viscosity of the composition.

A fuel cell system including a membrane-electrode assembly in accordance with one embodiment of the present invention includes at least one electricity generating element, a fuel supplier, and an oxidant supplier.

The electricity generating element includes the membrane-electrode assembly, which includes a polymer electrolyte membrane and a cathode and an anode positioned at both sides of the polymer electrolyte membrane, and separators (referred to also as a bipolar plate) positioned at both sides of the membrane-electrode assembly. The electricity generates electricity through oxidation of fuel and reduction of an oxidant.

The fuel supplier supplies the electricity generating element with a fuel including hydrogen, and the oxidant supplier supplies the electricity generating element with an oxidant. The fuel includes liquid or gaseous hydrogen fuel, or a hydrocarbon-based fuel such as methanol, ethanol, propanol, butanol, or natural gas. The oxidant includes oxygen or air.

According to one embodiment of the present invention, the fuel cell system may be a direct oxidation fuel cell system using hydrocarbon fuels.

A schematic structure of a fuel cell system 1 according to one embodiment of the present invention is illustrated in FIG. 1, which illustrates just one of many embodiments of fuel cell systems. Some of the fuel cell systems use pumps to supply the fuel and/or oxidant to the electricity generating element and others supply the fuel and/or oxidant in a diffusion manner and do not use pumps.

Referring to FIG. 1, the fuel cell system 1 includes at least one electricity generating element 3 to generate electrical energy through oxidation of a fuel provided by a fuel supplier 5 and reduction of an oxidant provided by an oxidant supplier 7.

In addition, the fuel supplier 5 is equipped with a tank 9, which stores the fuel, and a pump 11, which is connected to the tank 9. The fuel pump 11 supplies the fuel stored in the tank 9 to a stack 15.

The oxidant supplier 7, which supplies the electricity generating element 3 with the oxidant, is equipped with at least one pump 13 for supplying the oxidant to the stack.

The electricity generating element 3 includes a membrane-electrode assembly 17, which oxidizes hydrogen or a fuel and reduces an oxidant, and separators 19 and 19' that are respectively positioned at opposite sides of the membrane-electrode assembly 17 and supply hydrogen or a fuel and an oxidant, respectively. A plurality of electricity generating elements 3 constitutes the stack 15.

The following examples illustrate the present invention in more detail. However, it is understood that the present invention is not limited by these examples.

Example 1

5 wt % of a perfluorosulfonic acid resin solution of NAFION/$H_2O$/2-propanol (Solution Technology Inc., EW=1100) was evaporated at room temperature and then was added into dimethylacetamide (DMA) in a concentration of 5 wt %. Then, the resulting products were agitated at 100° C. for 24 hours to prepare a cation exchange resin solution.

A polyvinylidene fluoride (PVdF, Elf Atochem, KYNAR761) non-proton-conductive polymer was added to the DMA in a concentration of 5 wt % and then was dissolved by agitating at 100° C. for 24 hours. 70 g of the NAFION/DMA solution and 30 g of the PVdF/DMA solution were mixed and then agitated at 100° C. for 24 hours to prepare a mixed compatible cation exchange resin-polymer solution. Montmorillonite inorganic additive particles having an aspect ratio ranging from 1/200 to 1/800 (Cloisite10A, Southern Clay Products, Inc.) were added to the cation exchange resin-polymer solution at 100° C. Then the mixture was mechanically agitated and ultrasound was applied to disperse the inorganic material components uniformly and to thereby prepare the proton transport layer composition. The montmorillonite inorganic additive was added in an amount of 1 part by weight based on 100 parts by weight of the sum of the proton conductive cation exchange resin and non-proton-conductive polymer.

The proton transport layer composition was coated on a polyvinylidene fluoride polymer supporter with more than 60% porosity and then dried at 100° C. to prepare a polymer electrolyte membrane for a fuel cell. The resulting polymer electrolyte membrane was 30 μm thick with the inorganic additive dispersed in a nano-state inside the polymer electrolyte membrane. In the resulting polymer electrolyte membrane, the cation exchange resin, the non-proton-conductive polymer, and the inorganic additive were in a weight ratio of 70:30:1.

Example 2

A polymer electrolyte membrane was fabricated by substantially the same method as in Example 1 except that the montmorillonite inorganic additive was added in an amount of 10 parts by weight based on 100 parts by weight of the sum of the proton conductive cation exchange resin and non-proton-conductive polymer.

Figure 2:
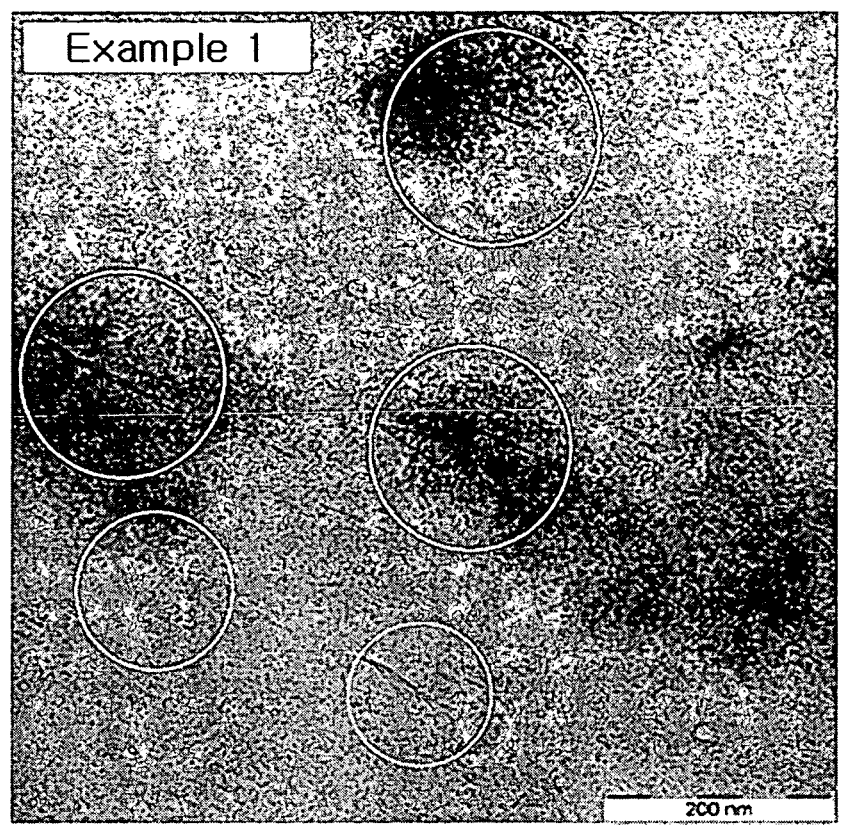
FIG. 2 is a TEM photograph showing a surface of a polymer electrolyte membrane according to Example 1 of the present invention.
Figure 3:
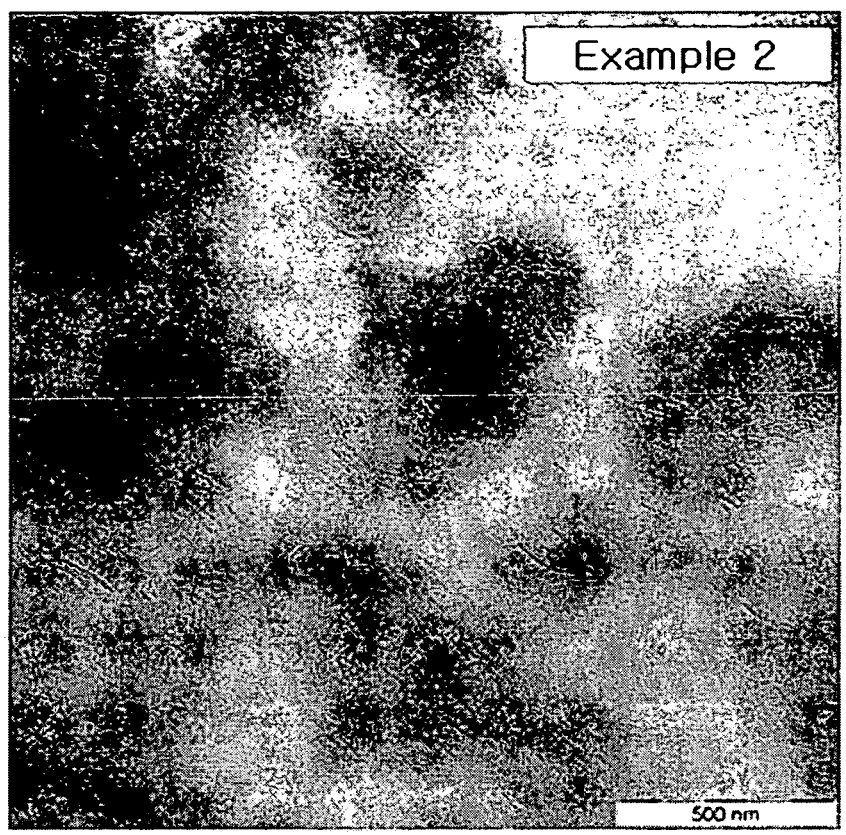
FIG. 3 is a TEM photograph showing a surface of a polymer electrolyte membrane according to Example 2 of the present invention.

TEM photographs of the surfaces of the polymer electrolyte membranes according to Examples 1 and 2 are illustrated in FIGS. 2 and 3. In FIGS. 2 and 3, the darkened portion illustrates a mixture of montmorillonite and polyvinylidene fluoride, and the long-lined portion particularly in the circle in FIG. 2 illustrates MMT.

Example 3

A polymer electrolyte membrane was fabricated by substantially the same method as in Example 1 except that the montmorillonite inorganic additive was added in an amount of 3 parts by weight based on 100 parts by weight of the sum of the proton conductive cation exchange resin and non-proton-conductive polymer.

Example 4

A polymer electrolyte membrane was fabricated by substantially the same method as in Example 1 except that the montmorillonite inorganic additive was added in an amount of 5 parts by weight based on 100 parts by weight of the sum of the proton conductive cation exchange resin and non-proton-conductive polymer.

Example 5

A polymer electrolyte membrane was fabricated by substantially the same method as in Example 1 except that the montmorillonite inorganic additive was added in an amount of 7 parts by weight based on 100 parts by weight of the sum of the proton conductive cation exchange resin and non-proton-conductive polymer.

Comparative Example 1

NAFION 117 was used as a polymer electrolyte membrane.

Comparative Example 2

NAFION 115 was used as a polymer electrolyte membrane.

Comparative Example 3

1 part by weight of montmorillonite inorganic additive particles having an aspect ratio ranging 1/200 to 1/800 (Cloisite10A, Southern Clay Products, Inc.) were added to 100 parts by weight of the cation exchange resin-polymer solution prepared according to Example 1. Using the resulting mixture, a polymer electrolyte membrane was made through a film manufacturing process.

Comparative Example 4

A polymer electrolyte membrane was fabricated by substantially the same method as in Comparative Example 3 except that the montmorillonite inorganic additive particles were used in an amount of 3 parts by weight of the cation exchange resin-polymer solution prepared according to Example 1.

Comparative Example 5

A polymer electrolyte membrane was fabricated by substantially the same method as in Comparative Example 3 except that the montmorillonite inorganic additive particles were used in an amount of 5 parts by weight of the cation exchange resin-polymer solution prepared according to Example 1.

Comparative Example 6

A polymer electrolyte membrane was fabricated by substantially the same method as in Comparative Example 3 except that the montmorillonite inorganic additive particles were used in an amount of 7 parts by weight of the cation exchange resin-polymer solution prepared according to Example 1.

X-Ray Diffraction Peak of a Polymer Electrolyte Membrane

Figure 4:
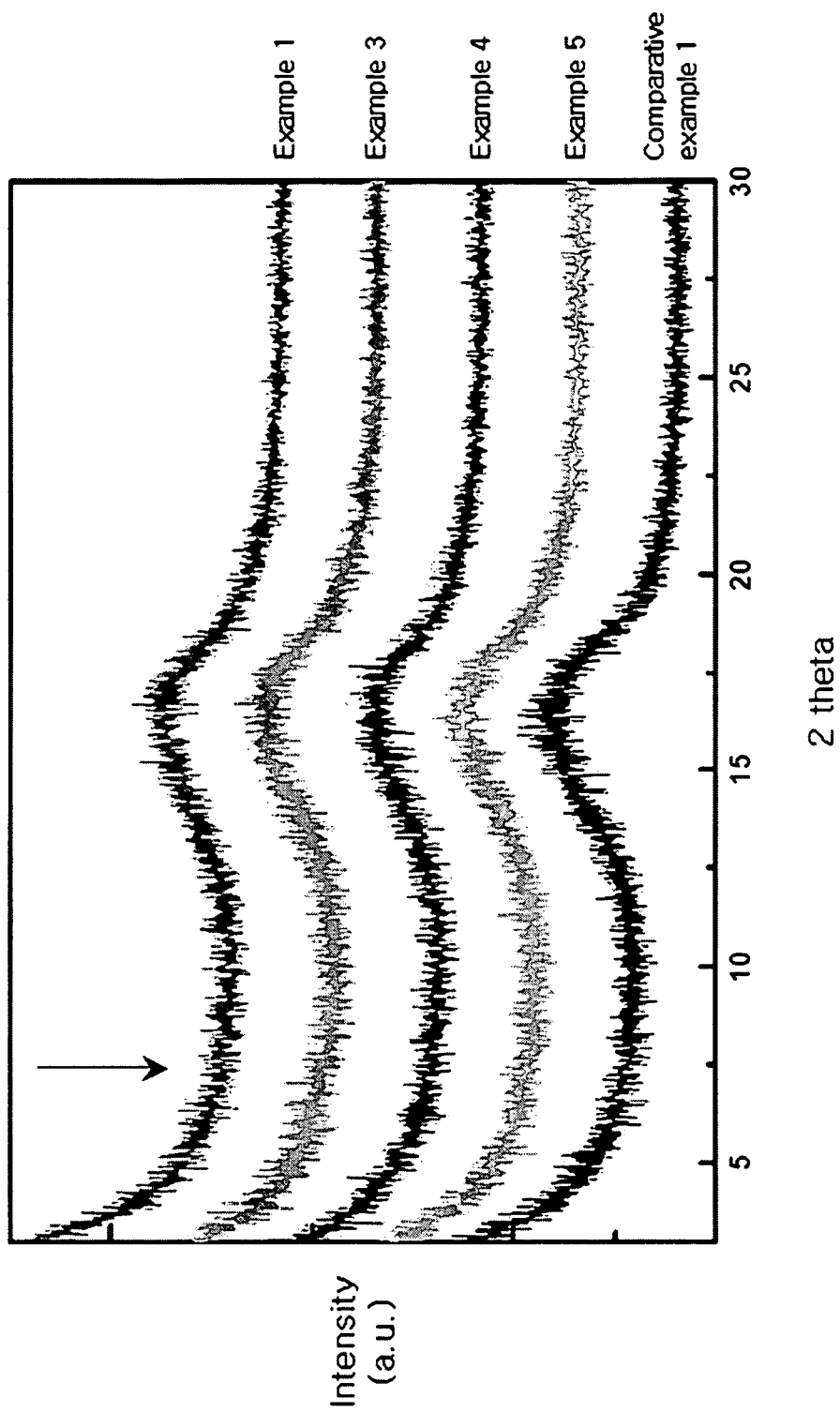
FIG. 4 is a graph showing X-ray diffraction peaks of polymer electrolyte membranes according to Example 1, 3, 4, and 5 and Comparative Example 1.

X-ray diffraction peaks of polymer electrolyte membranes according to Examples 1, 3, 4, and 5 and Comparative Example 1 were measured in order to evaluate whether the cation exchange resins and the silicate compounds were uniformly dispersed. The results are shown in FIG. 4.

X-ray diffraction peaks were measured using X-ray diffraction measurement equipment of an X-ray diffractometer (Phillips, X'pert Pro X-ray) with CuKα ray ($\lambda=1.5406$ Å). In FIG. 4, the portion indicated with an arrow corresponds to specific peaks of MMT. In the polymer electrolyte membranes, NAFION, MMT, and PVdF were miscible with each other, and so the specific peaks of MMT are not shown. Similar X-ray diffraction peaks are shown regardless of MMT and its adding amount indicating that crystallinity of the polymer electrolyte membrane is not affected by MMT.

Methanol Permeability

Figure 5:
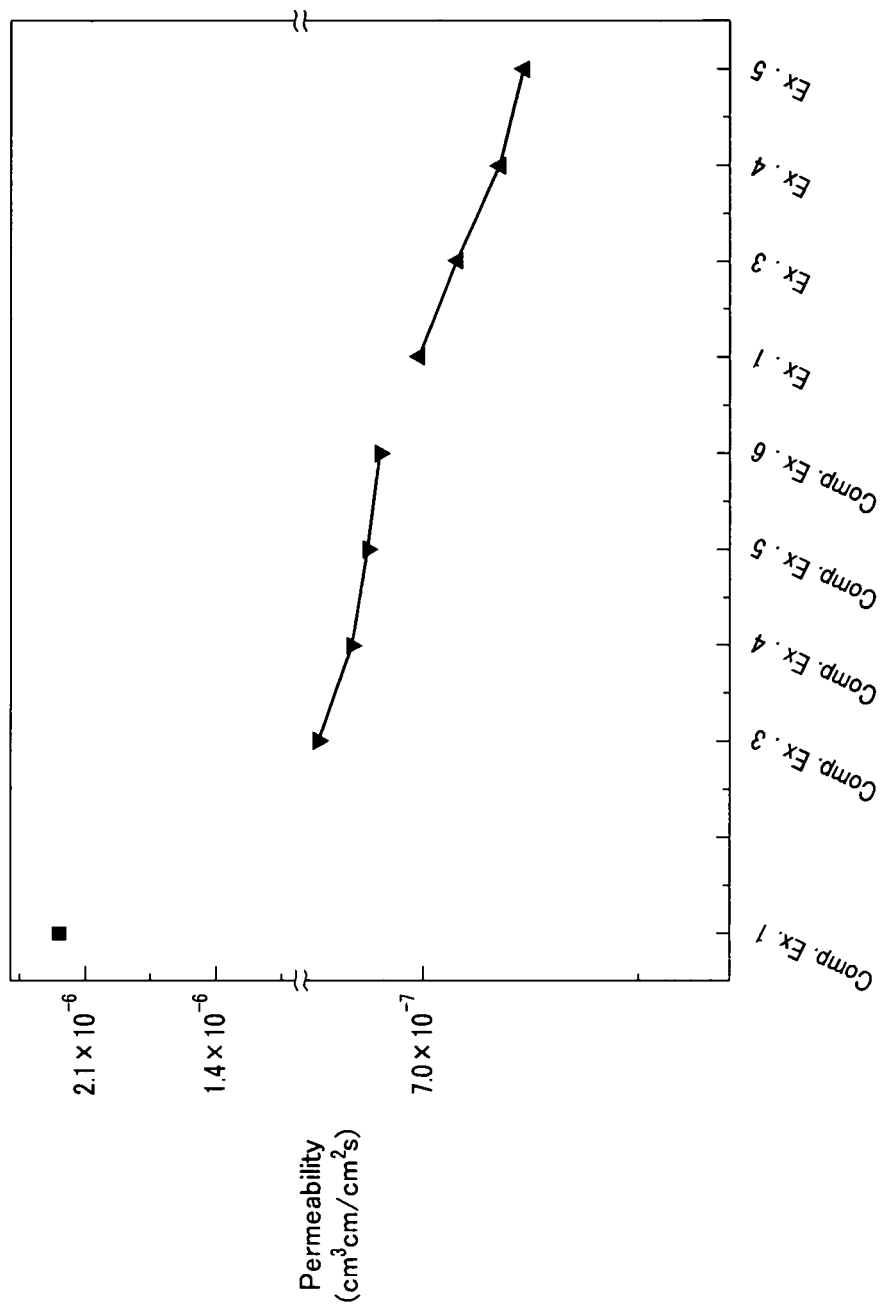
FIG. 5 is a graph showing methanol permeability of polymer electrolyte membranes according to Examples 1, 3, 4, and 5 and Comparative Examples 1, 3, 4, 5, and 6.

The methanol permeability of each of the polymer electrolyte membranes according to Examples 1, 3, 4, and 5 and Comparative Examples 1 and 3, 4, 5, and 6 was measured and the results are shown in FIG. 5.

As shown in FIG. 5, the membranes of Examples 1, 3, 4, and 5 have significantly lower methanol permeability than that of Comparative Example 1. The membranes of Examples 1, 3, 4, and 5 also have relatively lower methanol permeability than those of Comparative Examples 3, 4, 5, and 6 using the montmorillonite inorganic additive. These results show that the inorganic additive in each of the polymer electrolyte membranes according to the examples effectively inhibits the methanol pathway. Such an inhibition effect is greatly synergized when used along with the non-proton-conductive polymer.

Proton Conductivity

Figure 6:
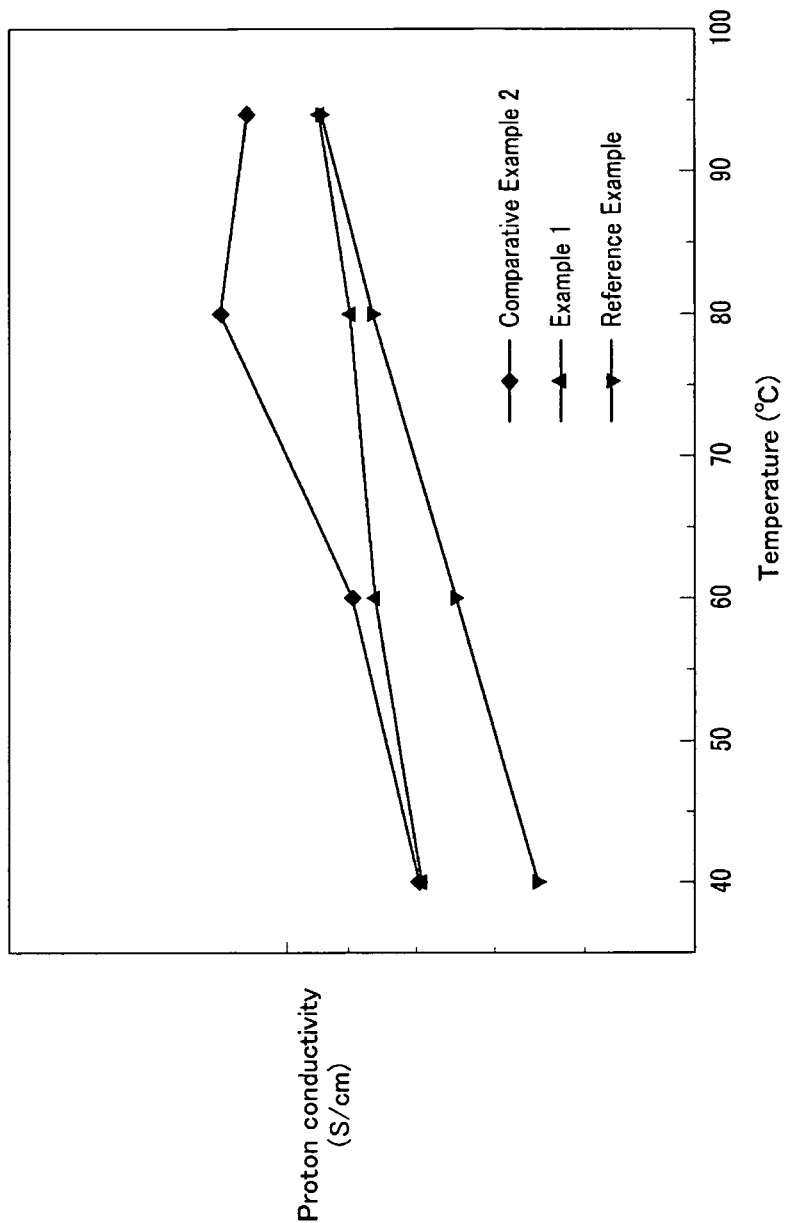
FIG. 6 is a graph showing proton conductivity of polymer electrolyte membranes according to Example 1, Comparative Example 2, and a Reference Example.

The proton conductivity of the polymer electrolyte membranes according to Example 1 and Comparative Example 2 was measured and the results are shown in FIG. 6. For comparison, the proton conductivity of a membrane that includes NAFION and polyvinylidene fluoride in a weight ratio of 6:4 used as a Reference Example is also shown.

As shown in FIG. 6, suitable proton conductivity was shown in an operating temperature of a methanol direct oxidation fuel cell, which can operate at room temperature, regardless of the use of MMT and polyvinylidene fluoride in Example 1.

As such, a polymer electrolyte membrane according to one embodiment of the present invention can be relatively thin and also have improved ion conductivity and mechanical properties and improved hydrocarbon fuel barrier characteristics. Therefore, the membrane may be used in a direct oxidation fuel cell.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A polymer electrolyte membrane for a fuel cell comprising:
    a mixture comprising a proton-conductive cation exchange resin and a non-proton-conductive polymer, the proton-conductive cation exchange resin comprising a polymer resin having a cation exchange group at its side chain, the cation exchange group being selected from the group consisting of a sulfonic acid group, a carboxylic acid group, a phosphoric acid group, a phosphonic acid group, and derivatives thereof, and the proton-conductive cation exchange resin comprising at least one proton-conductive polymer selected from the group consisting of fluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyetheretherketone-based polymers, polyphenylquinoxaline-based polymers, and combinations thereof;
    an inorganic additive adapted to inhibit a phase separation between the proton-conductive cation exchange resin and the non-proton-conductive polymer in the mixture, the inorganic additive comprising a material selected from the group consisting of pyrophylite-talcs, fluorohectorites, laponites, illites, and combinations thereof, and the inorganic additive being present in an amount ranging from about 1 to 10 parts by weight, based on 100 parts by weight of the sum of the proton-conductive cation exchange resin and the non-proton-conductive polymer; and
    a porous supporter comprising a non-proton-conductive supporting polymer adapted to support the mixture and the inorganic additive, and wherein the porous supporter comprises a plurality of pores.

2. The polymer electrolyte membrane of claim 1, wherein the proton-conductive cation exchange resin is a fluoro-based polymer.

3. The polymer electrolyte membrane of claim 1, wherein the non-proton-conductive supporting polymer comprises at least one homopolymer selected from the group consisting of polytetrafluoroethylene, polyvinylidene fluoride, polyethylene, polypropylene, polyimide, polybenzoxazole, polybenzimidazole, combinations thereof, and copolymers thereof.

4. The polymer electrolyte membrane of claim 1, wherein the non-proton-conductive supporting polymer comprises at least one material selected from the group consisting of polytetrafluoroethylene, polyvinylidene fluoride, copolymers thereof, and combinations thereof.

5. The polymer electrolyte membrane of claim 4, wherein the non-proton-conductive supporting polymer comprises polytetrafluoroethylene.

6. The polymer electrolyte membrane of claim 1, wherein the non-proton-conductive polymer comprises at least one material selected from the group consisting of polyvinylidene fluoride homopolymers, polyvinylidene fluoride-hexafluoropropylene copolymers, polyacrylonitrile, polymethylmethacrylate, polyvinylalcohol, and combinations thereof.

7. The polymer electrolyte membrane of claim 1, wherein the proton-conductive cation exchange resin and the non-proton-conductive polymer are present in a mixing ratio of 50 to 90:10 to 50.

8. The polymer electrolyte membrane of claim 7, wherein the proton-conductive cation exchange resin and the non-proton-conductive polymer, are present in a mixing ratio of 70 to 80:20 to 30.

9. The polymer electrolyte membrane of claim 1, wherein the inorganic additive may be used in an amount ranging from 1 to 5 parts by weight, based on 100 parts by weight of the sum of the proton-conductive cation exchange resin and the non-proton-conductive polymer.

10. The polymer electrolyte membrane of claim 1, wherein the inorganic additive is dispersed in a nano-state.

11. The polymer electrolyte membrane of claim 1, wherein the porous supporter has a porosity of not less than 60%.

12. The polymer electrolyte membrane of claim 1, wherein the inorganic additive is a silicate having an aspect ratio of from 1/50 to 1/1000.

13. The polymer electrolyte membrane of claim 1, wherein the ion exchange ratio of the proton-conductive cation exchange resin ranges from about 3 to 33, and wherein the equivalent weight (EW) of the proton-conductive cation exchange resin ranges from about 700 to 2,000.

14. A membrane-electrode assembly for a fuel cell comprises
    an anode and a cathode facing each other, and
    a polymer electrolyte membrane interposed between the anode and the cathode,
    wherein the polymer electrolyte membrane comprises:
    a mixture comprising a proton-conductive cation exchange resin and a non-proton-conductive polymer, the proton-conductive cation exchange resin comprising a polymer resin having a cation exchange group at its side chain, the cation exchange group being selected from the group consisting of a sulfonic acid group, a carboxylic acid group, a phosphoric acid group, a phosphonic acid group, and derivatives thereof, and the proton-conductive cation exchange resin comprising at least one proton-conductive polymer selected from the group consisting of fluoro-based polymers, benzimidazole-based polymers, polyimide-based polymers, polyetherimide-based polymers, polyphenylenesulfide-based polymers, polysulfone-based polymers, potyethersulfone-based polymers, polyetherketone-based polymers, polyetheretherketone-based polymers, polyphenylquinoxaline-based polymers, and combinations thereof;
    an inorganic additive adapted to inhibit a phase separation between the proton-conductive cation exchange resin and the non-proton-conductive polymer in the mixture, the inorganic additive comprising a material selected from the group consisting of pyrophylite-talcs, fluorohectorites, laponites, illites, and combinations thereof, and the inorganic additive being present in an amount ranging from about 1 to 10 parts by weight, based on 100 parts by weight of the sum of the proton-conductive cation exchange resin and the non-proton-conductive polymer; and
    a porous supporter comprising a non-proton-conductive supporting polymer adapted to support the mixture and the inorganic additive, and wherein the porous supporter comprises a plurality of pores.

15. The membrane-electrode assembly of claim 14, wherein the non-proton-conductive supporting polymer comprises at least one homopolymer selected from the group consisting of polytetrafluoroethylene, polyvinylidene fluoride, polyethylene, polypropylene, polyimide, polybenzoxazole, polybenzimidazole, combinations thereof, and copolymers thereof.

16. The membrane-electrode assembly of claim 14, wherein the non-proton-conductive polymer comprises at least one material selected from the group consisting of polyvinylidene fluoride homopolymers, polyvinylidene fluoride-hexafluoropropylene copolymers, polyacrylonitrile, polymethylmethacrylate, polyvinyl alcohol, and combinations thereof.

17. The membrane-electrode assembly of claim 14, wherein the proton-conductive cation exchange resin and the non-proton-conductive polymer are present in a mixing ratio of 50 to 90:10 to 50.

18. The membrane-electrode assembly of claim 14, wherein the inorganic additive is dispersed in a nano-state.

19. The membrane-electrode assembly of claim 14, wherein the porous polymer supporter has a porosity of not less than 60%.

20. The membrane-electrode assembly of claim 14, wherein the polymer electrolyte membrane is used in a direct oxidation fuel cell.

21. The membrane-electrode assembly of claim 14, wherein the ion exchange ratio of the proton-conductive cation exchange resin ranges from about 3 to 33 and wherein the equivalent weight (EW) of the proton-conductive cation exchange resin ranges from about 700 to 2,000.

22. A fuel cell system comprising: at least one electricity generating element comprising
an anode and a cathode facing each other, and
a polymer electrolyte membrane interposed between the anode and the cathode and comprising:
a mixture comprising a proton-conductive cation exchange resin and a non-proton-conductive polymer, the proton-conductive cation exchange resin comprising a polymer resin having a cation exchange group at its side chain, the cation exchange group being selected from the group consisting of a sulfonic acid group, a carboxylic acid group, a phosphoric acid group, a phosphonic acid group, and derivatives thereof, and the proton-conductive cation exchange resin comprising at least one proton-conductive polymer selected from the group consisting of fluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyetheretherketone-based polymers, polyphenylquinoxaline-based polymers, and combinations thereof;
an inorganic additive adapted to inhibit a phase separation between the proton-conductive cation exchange resin and the non-proton-conductive polymer in the mixture, the inorganic additive comprising a material selected from the group consisting of pyrophylite-talcs, fluorohectorites, laponites, illites, and combinations thereof, and the inorganic additive being present in an amount ranging from about 1 to 10 parts by weight, based on 100 parts by weight of the sum of the proton-conductive cation exchange resin and the non-proton-conductive polymer; and
a porous supporter comprising a non-proton-conductive supporting polymer adapted to support the mixture and the inorganic additive, and wherein the porous supporter comprises a plurality of pores;
a fuel supplier adapted to supply a fuel to the electricity generating element; and
an oxidant supplier adapted to supply an oxidant to the electricity generating element.

23. The fuel cell system of claim 22, wherein the non-proton-conductive supporting polymer comprises at least one homopolymer selected from the group consisting of polytetrafluoroethylene, polyvinylidene fluoride, polyethylene, polypropylene, polyimide, polybenzoxazole, polybenzimidazole, combinations thereof, and copolymers thereof.

24. The fuel cell system of claim 22, wherein the fuel cell system is a direct oxidation fuel cell system.

* * * * *